(12) United States Patent
Baranowsky

(10) Patent No.: US 11,630,810 B2
(45) Date of Patent: *Apr. 18, 2023

(54) SYSTEMS AND METHODS FOR TUNING A STORAGE SYSTEM

(71) Applicant: Oracle International Corporation, Redwood Shores, CA (US)

(72) Inventor: Michael J. Baranowsky, Markham (CA)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,157

(22) Filed: Aug. 5, 2022

(65) Prior Publication Data

US 2022/0382720 A1 Dec. 1, 2022

Related U.S. Application Data

(63) Continuation of application No. 16/058,583, filed on Aug. 8, 2018, now Pat. No. 11,442,904, which is a
(Continued)

(51) Int. Cl.
*G06F 16/182* (2019.01)
*G06F 11/30* (2006.01)
(Continued)

(52) U.S. Cl.
CPC ...... *G06F 16/1827* (2019.01); *G06F 11/3034* (2013.01); *G06F 11/3433* (2013.01);
(Continued)

(58) Field of Classification Search
CPC ............. G06F 16/1827; G06F 11/3034; G06F 11/3433; G06F 3/061; G06F 3/0653; G06F 3/067; G06F 11/3414; G06F 11/3442

See application file for complete search history.

(56) References Cited

U.S. PATENT DOCUMENTS 7,032,119 B2  4/2006  Fung
7,299,277 B1  11/2007  Moran et al.
(Continued)

FOREIGN PATENT DOCUMENTS

WO  2016209213  12/2016

OTHER PUBLICATIONS

Milo et al, REACT: Context Sensitive Recommendations for Data Analysis, SIGMOD'16, Available Online: http://www.cs.tau.ac.il/~milo/projects/modas/papers/sigmod16b.pdf, Jun. 26-Jul. 1, 2016, pp. 2137-2140.
(Continued)

*Primary Examiner* — Chris Parry
*Assistant Examiner* — Steven C Nguyen
(74) *Attorney, Agent, or Firm* — Kilpatrick Townsend & Stockton LLP

(57) ABSTRACT

Implementations described and claimed herein provide systems and methods for tuning and sizing one or more storage appliances in a storage system with respect to an application load and for optimizing a storage system based on a configuration of a client network and/or a storage appliance in a storage network. In one implementation, data corresponding to an application load configured to be applied to a storage appliance in the storage system is obtained. The application load is characterized in the context of a configuration of the storage system. One or more recommendations for optimizing performance of the storage system based on the characterized application load are generated.

20 Claims, 7 Drawing Sheets

Related U.S. Application Data continuation of application No. 13/895,951, filed on May 16, 2013, now Pat. No. 10,073,858.

(51) Int. Cl.
  *G06F 11/34* (2006.01)
  *G06F 3/06* (2006.01)

(52) U.S. Cl.
  CPC .............. *G06F 3/061* (2013.01); *G06F 3/067* (2013.01); *G06F 3/0653* (2013.01); *G06F 11/3414* (2013.01); *G06F 11/3442* (2013.01)

(56) References Cited

U.S. PATENT DOCUMENTS

| | | |
|---|---|---|
| 7,412,516 B1 | 8/2008 | Brown et al. |
| 7,624,241 B2 | 11/2009 | Eguchi et al. |
| 7,627,658 B2 | 12/2009 | Levett et al. |
| 8,060,866 B2 | 11/2011 | Weatherbee et al. |
| 8,145,614 B1 | 3/2012 | Zimran et al. |
| 8,204,809 B1 | 6/2012 | Wise |
| 8,219,652 B2 | 7/2012 | Newton et al. |
| 8,291,108 B2 | 10/2012 | Raja et al. |
| 8,468,241 B1 | 6/2013 | Raizen et al. |
| 8,484,565 B2 | 7/2013 | Yamashita |
| 8,484,656 B2 | 7/2013 | Raja et al. |
| 8,825,752 B1 | 9/2014 | Madhavan |
| 8,856,077 B1 | 10/2014 | Roth et al. |
| 9,137,733 B2 | 9/2015 | Saska et al. |
| 9,197,642 B1 | 11/2015 | Urbach |
| 9,215,142 B1 | 12/2015 | Herold et al. |
| 9,244,956 B2 | 1/2016 | Bice et al. |
| 9,258,203 B1 | 2/2016 | Goodwin et al. |
| 9,258,355 B2 | 2/2016 | Chandra et al. |
| 9,380,508 B2 | 6/2016 | Ganu et al. |
| 9,465,398 B2 | 10/2016 | Forbes, Jr. |
| 9,625,532 B2 | 4/2017 | Gering |
| 9,813,401 B2 | 11/2017 | Malatesha et al. |
| 9,942,306 B2 | 4/2018 | Chandra et al. |
| 10,073,858 B2 | 9/2018 | Baranowsky |
| 11,442,904 B2 | 9/2022 | Baranowsky |
| 2003/0037061 A1 | 2/2003 | Sastri et al. |
| 2003/0212775 A1 | 11/2003 | Steele et al. |
| 2006/0010389 A1 | 1/2006 | Rooney et al. |
| 2006/0271677 A1 | 11/2006 | Mercier |
| 2007/0130335 A1 | 6/2007 | Loher |
| 2008/0034425 A1 | 2/2008 | Overcash et al. |
| 2008/0114847 A1 | 5/2008 | Ma et al. |
| 2008/0163234 A1* | 7/2008 | Strange ............... H04L 41/5009 718/104 |
| 2009/0276771 A1 | 11/2009 | Nickolov et al. |
| 2010/0332373 A1 | 12/2010 | Crabtree et al. |
| 2011/0022812 A1* | 1/2011 | van der Linden ...... H04L 69/08 711/E12.001 |
| 2011/0153697 A1 | 6/2011 | Nickolov et al. |
| 2012/0123994 A1 | 5/2012 | Lowry et al. |
| 2014/0003357 A1 | 1/2014 | Ejzak et al. |
| 2014/0101306 A1 | 4/2014 | Murgia |
| 2014/0156926 A1* | 6/2014 | Chavda ................. G06F 3/0689 711/114 |
| 2015/0242408 A1 | 8/2015 | Frohock et al. |
| 2016/0092474 A1 | 3/2016 | Stojanovic et al. |
| 2016/0092557 A1 | 3/2016 | Stojanovic et al. |
| 2016/0328406 A1 | 11/2016 | Convertino et al. |
| 2017/0308595 A1 | 10/2017 | Dey et al. |

OTHER PUBLICATIONS

U.S. Appl. No. 13/895,951, Final Office Action dated Nov. 20, 2015, 14 pages.
U.S. Appl. No. 13/895,951, Final Office Action dated Jan. 23, 2017, 16 pages.
U.S. Appl. No. 13/895,951, Final Office Action dated Dec. 27, 2017, 21 pages.
U.S. Appl. No. 13/895,951, Non-Final Office Action dated Aug. 31, 2016, 12 pages.
U.S. Appl. No. 13/895,951, Non-Final Office Action dated Mar. 16, 2016, 12 pages.
U.S. Appl. No. 13/895,951, Non-Final Office Action dated Jul. 6, 2015, 13 pages.
U.S. Appl. No. 13/895,951, Non-Final Office Action dated Jun. 15, 2017, 16 pages.
U.S. Appl. No. 13/895,951, Non-Final Office Action dated Jan. 30, 2015, 9 pages.
U.S. Appl. No. 13/895,951, Notice of Allowance dated Apr. 24, 2018, 8 pages.
U.S. Appl. No. 16/058,583, Corrected Notice of Allowability dated May 27, 2022, 2 pages.
U.S. Appl. No. 16/058,583, Final Office Action dated Jul. 13, 2021, 16 pages.
U.S. Appl. No. 16/058,583, Non-Final Office Action dated Jan. 4, 2021, 14 pages.
U.S. Appl. No. 16/058,583, Non-Final Office Action dated Oct. 29, 2021, 17 pages.
U.S. Appl. No. 16/058,583, Notice of Allowance dated May 13, 2022, 14 pages.

* cited by examiner

SYSTEMS AND METHODS FOR TUNING A STORAGE SYSTEM

CROSS-REFERENCES TO RELATED APPLICATIONS

This application is a continuation application of U.S. Non-Provisional application Ser. No. 16/058,583, filed Aug. 8, 2018, entitled "SYSTEMS AND METHODS FOR TUNING A STORAGE SYSTEM," which is a continuation application of U.S. Non-Provisional application Ser. No. 13/895,951, filed May 16, 2013, entitled "SYSTEMS AND METHODS FOR TUNING A STORAGE SYSTEM," which is now U.S. Pat. No. 10,073,858, the entire disclosures of all of the preceding incorporated herein by reference for all purposes.

TECHNICAL FIELD

Aspects of the present disclosure relate to network file systems utilizing storage appliances. More particularly, aspects of the present disclosure involve systems and methods for tuning and sizing one or more storage appliances in a storage system with respect to a client application load.

BACKGROUND

The continuous expansion of the Internet, the expansion and sophistication of enterprise computing networks and systems, the proliferation of content, like movies, stored and accessible over the Internet, and numerous other factors continues to drive the need for large sophisticated data storage systems. Consequently, as the demand for data storage continues to increase, larger and more sophisticated storage systems are being designed and deployed. Many large scale data storage systems utilize storage appliances that include arrays of storage media. These storage appliances are capable of storing incredible amounts of data. For example, at this time, Oracle's SUN ZFS Storage 7420 appliance can store over 2 petabytes of data (over 2 quadrillion bytes of data). Moreover, multiple storage appliances may be networked together to form a cluster, which allows for an increase in the volume of stored data. Additionally, storage appliances arranged in a cluster may be configured to mirror data so that if one of the storage appliances becomes inoperable, the data is available at another storage location.

As the number of components, the number of users, and the volume of data increases, so does the size and complexity of the storage system. Occasionally, a client utilizing a storage system having storage appliances encounters a performance issue resulting in the appearance of: the storage appliance running slowly; an outage; or other performance degradations.

Conventional diagnostic approaches are often inconsistent in addressing and resolving such performance issues. For example, many conventional diagnostic approaches begin by analyzing the storage appliance with the assumption that a fault (i.e., a failure of all or part of the storage system) exists, and as a result, often mis-identify the problem or waste time or resources. Further, conventional diagnostic approaches fail to analyze how the entire storage system is interacting in diagnosing and remedying performance issues, leaving unaddressed issues relating to the client data load applied to the storage appliance and relating to how the storage appliance and/or the client network are configured.

It is with these observations in mind, among others, that various aspects of the present disclosure were conceived and developed.

BRIEF SUMMARY

Implementations described and claimed herein address the foregoing problems by providing systems and methods for tuning a storage system. In one implementation, data corresponding to an application load configured to be applied to a storage appliance in the storage system is obtained. The application load is characterized in the context of a configuration of the storage system. One or more recommendations for optimizing performance of the storage system based on the characterized application load are generated.

Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

DETAILED DESCRIPTION

Figure 1:
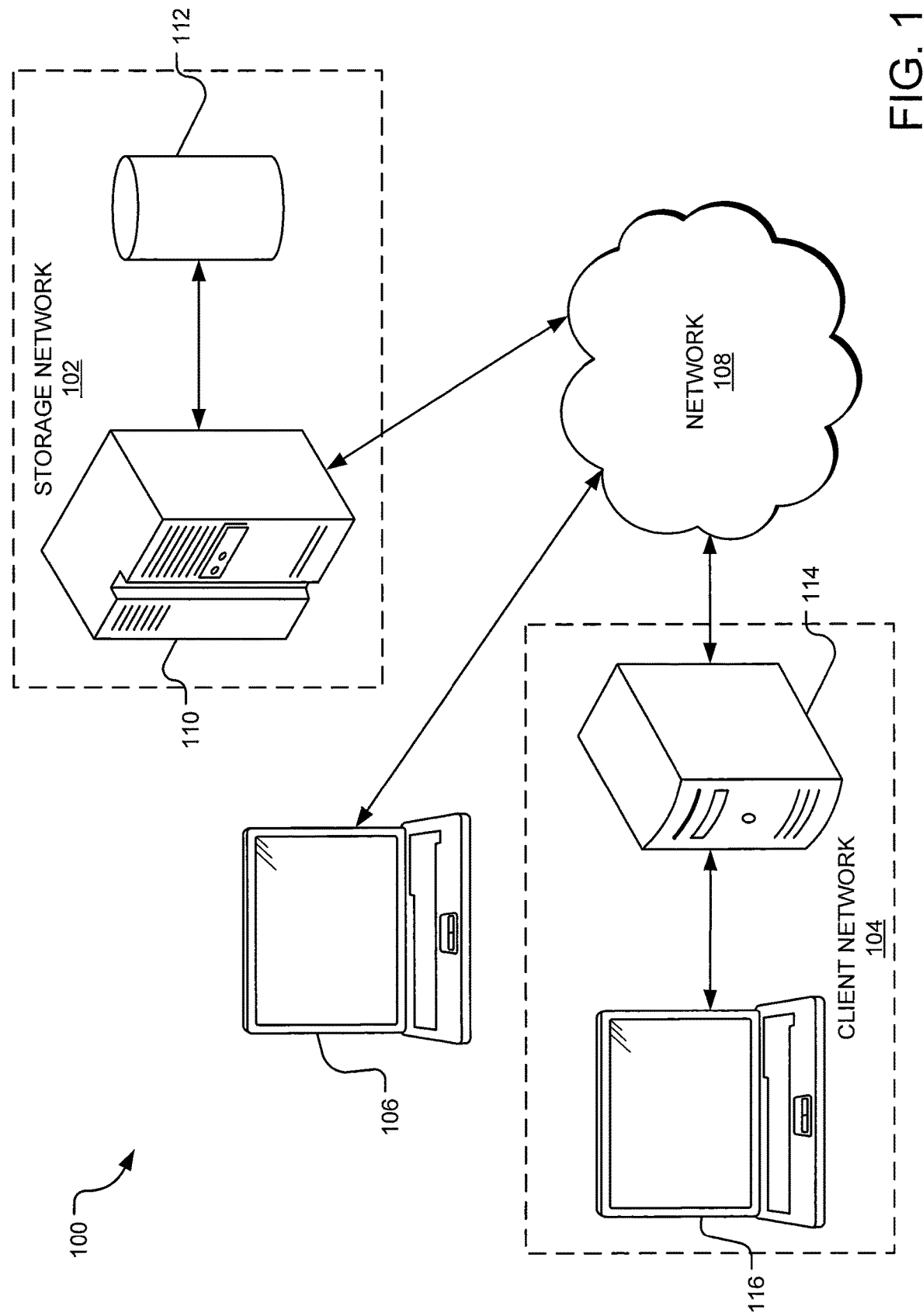
FIG. 1 is an example storage system that may be used in implementing various systems and methods discussed herein.

Aspects of the present disclosure involve systems and methods for tuning and sizing one or more storage appliances in a storage system with respect to an application load and for optimizing a storage system based on a configuration of a client network and/or a storage appliance in a storage network. Often, the systems and methods set forth herein will be used when information technology personnel or software executed on a computing device identify some form of performance issue involving a storage appliance. In contrast to many conventional diagnostic systems, the systems and methods set out herein systematically consider a variety of issues that may impact performance. In some instances, the issues considered do not involve the storage appliance itself but instead involve how the storage appliance is being used.

In one example, a baseline for approaching client specific issues is provided. More specifically, the baseline involves the characterization of an application load applied to a storage appliance in the context of a client network in a storage system. Based on the characterized application load, the storage system is tuned to optimize performance of the storage appliance as it relates to the client network in the storage system. As such, the storage system is tuned based on how the entire platform of the storage system is interacting. Overall, the systems and methods set out herein may identify optimal performance tuning opportunities and provide recommendations for optimizing the storage appliance, the client network, and/or the supporting network infrastructure, which recommendations may also be generated and deployed.

Stated differently, in tuning the storage system, data is collected to characterize an application load as related to a configuration of the storage system. Here, the systems and methods set out herein analyze not only storage appliance performance but also analyze the load and use of the storage appliance by the enterprise or network in which it resides. A report may then be generated identifying one or more recommendations for optimizing the storage system based on the characterized load, and the storage system may be tuned by deploying the recommendations. The tuning operations may be performed to: diagnose any reported or otherwise identified problem; proactively examine the storage system to optimize performance; initially configure the storage system to meet demands of the client; and/or otherwise tune or update the storage system. Thus, the systems and methods set out herein are not necessarily only used when a problem or performance issue is identified.

It will be appreciated that aspects of the present disclosure may be used to characterize a data load applied in a variety of network environments and to optimize one or more components of the network environment with respect to the characterized data load. For a detailed discussion of optimization of a storage system based on a characterized application load applied to a storage appliance, reference is now made to FIG. 1.

As can be understood from FIG. 1, an example storage system 100 includes a storage network 102, a client network 104, and an administrator system 106. The storage network 102 is accessible by the client network 104 using the network 108. It will be appreciated, however, that the various networks may comprise an integrated network, and the connections between the networks represent but one possible network topology. The depicted networks 102, 104, and 108 may also be local in nature or geographically dispersed, such as with large private enterprise networks or the Internet. The administrator system 106 provides various tuning, optimizing, and support services, among other functions, for the storage system 100. The administrator system 106 may be included in the storage network 102, the client network 104, and/or in another network connected via the network 108. Moreover, the administrator system 106 may be connected directly to the various networks or the devices within the network. As such, it is possible that many unique terminals or computing elements may be present within the storage system 100, and through which administrator functions may be performed.

In one implementation, the client network 104 includes one or more servers 114 connecting one or more client devices 116 to the network 108. The server 114 may be a single server, a plurality of servers with each such server being a physical server or a virtual machine, or a collection of both physical servers and virtual machines (VM). A virtual machine is a software implementation of a machine or component (e.g., a computing device) that executes programs like a physical machine. For example, a virtual machine may emulate an operating system (OS).

The client device 116 is generally any form of computing device capable of interacting with the network 108, such as a terminal, a personal computer, a portable computer, a mobile device, a tablet (e.g., iPad), a multimedia console, etc. In some implementations, the client network 106 includes one or more user interfaces, including, for example, a business user interface (BUI), permitting a client to interact with the storage network 102 to access data.

In one implementation, the storage network 102 includes one or more storage appliances 110, each including storage media 112. Generally, the storage appliance 110 manages the storage of data on the storage media 112, which may involve spinning media (e.g., disc drives) as well as various forms of solid state memory Although discussed herein in the context of a ZFS storage appliance, the storage appliance 110 may be any conventional storage appliance. ZFS is a combined file system and volume manager designed by Sun Microsystems® in 2005 that allows for data integrity verification and repair, high storage capacities, along with numerous other features and advantages.

ZFS based systems utilize a storage pool layer having one or more storage pools (often referred to as "zpools") comprising virtual devices (vdevs) constructed of block devices, such as the storage media 112. A block device is any device that moves data in the form of blocks, which may be, without limitation, hard disk drives, solid state drives, optical drives, magnetic drives, and other addressable regions of memory. A ZFS volume is a dataset that represents a block device. A virtual device may span a number of block devices or volumes, and a storage pool may include one or more virtual devices, each including one or more partitions of storage media or one or more storage media. ZFS volumes may be used as an Internet Small Computer System Interface (iSCSI) target. iSCSI protocol facilitates communication between the client network 104 and the storage appliance 110 over the network 108.

To mitigate the impact of the gap between processor performance and storage performance, the storage pool layer of the storage appliance 110 may implement hierarchical memory structures that place one or more higher speed memory caches in the pooled storage layer between the processor and the storage media 112, which is often slower storage. In one implementation, the storage appliance 110 includes a level 1 cache and a level 2 cache, with data being cached in a hierarchy to optimize performance. The level 2 cache operates in conjunction with the level 1 cache to provide caching functions for a storage pool. The level 1 cache may correspond to any tangible storage medium that stores data and may be a volatile storage media such as direct random access memory ("DRAM"). Certain data, such as frequently-accessed or recently-accessed data may be stored in the level 1 cache. In one possible implementation, the level 1 cache uses a variant of the Adaptive Replacement Cache ("ARC") algorithm. Data allowing for slower access is stored in the level 2 cache or the storage media 112. The level 2 cache and the storage media 112 may be persistent non-volatile storage, with the level 2 cache comprising faster memory and/or storage devices relative to the storage media 112. In one implementation, the level 2 cache comprises flash memory based solid state disks and the storage media 112 comprises hard disk drives. The level 2 cache may be, for example, L2ARC.

In one implementation, the storage appliance 110 includes an interface layer permitting the client device 116 to interact with the storage appliance 110 as a file system. The client device 116 may fetch data from the storage network 102 using a variety of data transport protocols, such as File Transfer Protocol (FTP). In one implementation, the network 108 provides a network address (e.g., an Internet Protocol (IP) address) to direct the client device 116 to the storage appliance 110. For example, the network 108 may utilize a domain name system (DNS) service, which resolves an alphanumeric domain name to an IP address of the storage appliance 110. The client network 104 may utilize server message block (SMB) as an application-layer network protocol to access the storage appliance 110.

Traffic to and from the storage appliance 110 is typically managed by one or more dedicated storage servers located within the storage appliance 110 or the storage network 102. A common protocol for accessing content, including files, directories, and their associated metadata is a Network File System (NFS), which is a widely used distributed file system protocol, originally developed by Sun Microsystems® in 1984. In one implementation, the storage appliance 110 is configured to operate using NFS. In this case, NFS allows the client network 104 to access stored data seamlessly by providing a programming interface permitting the client device 116 to: create and delete files; read and write files; perform seeks within a file; create and delete directories; manage directory contents; and perform other file, directory, or content operations. The operating system utilized by the client device 116 is configured to communicate with the NFS programming interface to manage the file system and the interaction between executing applications with data residing in the storage appliance 110.

To further facilitate communication between the client network 104 and the storage network 102, the storage system 100 may included a variety of network interfaces and connections in the network infrastructure. For example, IP network multipathing (IPMP) provides physical interface failure detection, transparent network access failover, and packet load spreading. Further, the network infrastructure may include one or more application-specific integrated circuits (ASIC) and/or one or more switches that link network devices within the storage system 100. In this case, the link aggregation control protocol (LACP) may be utilized to provide redundancy in the network connections in case a link in the network connections fails. For a layer, a maximum transmission unit (MTU) represents a size of the largest protocol data unit the layer can pass. The MTU is determined based on the interfaces and/or communications protocols of the storage system 100.

Generally, NFS systems manage file system metadata and provide access to files and directories. The metadata describes the location of the files and directories on the storage media 112. The storage appliance 110 maintains a log of current operations being performed by the client network 104. The storage appliance 110 is aware of the storage pools served by the storage appliance 110. Each storage pool has a corresponding distributed stable storage (DSS) path where the storage server writes persistent data about the client network 104 when the client network 104 contacts the storage network 102. This data may be used to identify data owed by the client network 104 if the client network 104 becomes disconnected from the storage network 102.

One feature of computing systems running ZFS, as well as other file systems, is the ability to perform replication, failover/failback, and deduplication operations, among other functions.

Replication allows for a system (e.g., the storage appliance 110) to create a replica of itself or a portion of itself on another system by utilizing snapshots. For example, a snapshot may include an image of the storage appliance 110 that may be used to recreate the state of the storage appliance 110. More specifically, a snapshot is a read-only copy of a file system or volume on the storage appliance 110 or other storage device that includes information needed to reproduce the file system or volume at the time of the snapshot. The client device 116 may use a snapshot to revert to an earlier functional state.

If a reboot, failover, takeover, failback, or similar event occurs, the action performed on the storage appliance 110 is stopped until the reboot, failover, takeover, failback, or the like completes. A reboot involves the entire system of the storage appliance 110 shutting down and discontinuing the processes running on the storage appliance 110. Normal operation may be restarted following the reboot. A failover or takeover involves a plurality of the storage appliances 110 networked together to form a cluster. Each of the storage appliances 110, often referred to as "nodes," export different resources, pools, and interfaces to the client network 104. During a failover or takeover, one of the storage appliances 110 transfers its responsibilities for managing its various resources, storage pools, and interfaces to the other storage appliance 110, and domain name system ("DNS") paths are copied to the other storage appliance 110. A failover or takeover is generally triggered when one of the nodes reboots or encounters a problem and is no longer capable of maintaining operations. A failback involves a node coming back online such that the storage pools and interfaces taken over by the other node are transferred back to the original node. Once the reboot, failover, takeover, failback, or the like completes, the last state of the client network 104 is sent to the storage network 102 to complete outstanding actions.

The storage appliance 110 may perform deduplication operations to remove redundancy from stored data by storing unique data a single time and subsequent, redundant copies of that data as indices in a deduplication table pointing to the unique data. As a result, data can be stored in a fraction of the physical space that would otherwise be required. Data deduplication involves performing a lookup into the deduplication table prior to writing data to determine if the data is a duplicate of existing data.

In one implementation, the storage network 102 includes an Integrated Lights Out Manager (ILOM), which provides advanced service processor (SP) hardware and software to manage and monitor components of the storage system 100, including, without limitation, nodes, gateway switches, the storage appliance 110, and other switches, independently of an operating system. For example, ILOM may provide notifications about hardware errors and faults as they occur.

As the size and complexity of the storage system 100 increases, faults and/or performance issues may be experienced, which occur in any environment having the sophistication of the storage system 100. As discussed herein, conventional diagnostic approaches are often inconsistent and can be ineffective in identifying and resolving problems. Accordingly, the administrator system 106 provides various tuning, optimizing, and support services, among other functions, for the storage system 100 based on an application load and a configuration of the storage network 102 as related to the client network 104. Stated differently, the systems and methods set out herein provide a simple, efficient, and holistic approach for diagnosing and remedying issues in the storage system 100 by analyzing and optimizing the behavior of: the storage appliance 110 in the storage network 102; the client network 104 and its application; the management of data by the client network 104; and the supporting network infrastructure of the storage system 100.

In some implementations, the administrator system 106 includes a call center, field technician, professional servicers, or other person or group associated with the storage network 102 and/or with the client network 104, or independent of both. Further, the administrator system 106 may include a component of the storage system 100 having instructions for executing characterizing and tuning operations. For example, the administrator system 106 may include any form of computing device capable of interacting with the various components of the storage system 100 over the network 108, such as a terminal, a personal computer, a portable computer, a mobile device, a tablet (e.g., iPad), a multimedia console, etc. The computing device included in the administrator system 106 executes software configured to collect data and provide recommendations for optimizing performance of the storage system 100.

In one implementation, the administrator system 106 tunes a client application and/or the storage appliance 110 to meet the desired parameters and operations of the client network 104. As a result, the administrator system 106 addresses any existing performance issues, rather than expending resources attempting to determine whether a fault exists. A fault is a software or hardware condition that prevents or otherwise ceases operation of all or part of the storage system 100. The diagnostic approach taken by the administrator system 106 shifts the focus from that of conventional approaches, which merely attempt to locate faults, to an optimization of the performance of the client network 104 within the storage system 100.

Accordingly, the operations performed by the administrator system 106 reduce the resources consumed by troubleshooting a fault, which may not exist, and provide the rapid and effective remediation of performance issues. Stated differently, the administrator system 106 anticipates that both faults and performance issues may contribute to problems with the storage system 100. The administrator system 106 determines if a fault exists in the storage system 100 in addition to identifying tuning or sizing opportunities of the storage appliance 110 by isolating areas where operational parameters may be changed or refined to improve the performance of the client network 104 in the storage system 100. The administrator system 106 provides a baseline in a client environment to isolate performance issues and tune the storage system 100 based on those issues.

In one implementation, in performing diagnostics operations, the administrator system 106 eliminates faults in various hardware and software components of the storage system 100, before examining the load applied to the storage appliance 110. In examining the applied load, the administrator system 106 determines operational limits of the storage appliance 110 in the context of the configuration of the storage system 100, rather than just identifying where performance issues bottleneck in the storage appliance 110. In doing this, the administrator system 106 identifies opportunities to optimize the performance of the storage application 110 as related to the applied load and the configuration of the client network 104.

As detailed above, the administrator system 106 performs diagnostic operations to evaluate and remedy a reported or otherwise identified issue. Further, in some implementations, the administrator system 106 may perform an initial configuration of the storage system 100 and/or perform a proactive health or status check by characterizing the application load and tuning the storage system 100 based on the characterized application load during initial configuration and at various intervals following the initial configuration. Tuning operations may be initiated as issues are reported or otherwise identified and executed in substantially real time on-the-fly.

The administrator system 106 may perform all or a portion of the operations automatically or manually. In one implementation, the administrator system 106 runs a script on the client network 104 against the storage appliance 110 to gather data and generate a report characterizing the applied load and providing recommendations that may be manually applied.

The script may utilize, for example, a comprehensive dynamic tracing framework (e.g., DTrace) for troubleshooting in substantially real time. In another implementation, the administrator system 106 sets the script to apply the attributes and recommendations of the generated report to the storage system 100.

In yet another implementation, the administrator system 106 comprises an integrated tool allowing the storage appliance 110 to auto-tune relative to the applied load, characterized based on collected data. Stated differently, the storage appliance 110 may be auto-tuned through a set of one or more queries and applied rules to generate a report of recommendations and to deploy the recommendations. For example, the administrator system 106 may utilize a DTrace script to query the storage appliance 110 and/or other components of the storage system 100 to gather data over a period of time and generate a report characterizing the application load and identifying opportunities for optimizing the storage system 100 based on the characterized load. The administrator system 106 deploys the recommendations with parameters of the storage system 100 being modified based on the characterized application load.

Accordingly, the administrator system 106 examines various aspects and components of the storage system 100 and tunes the client network 104, the storage network 102, and the supporting network infrastructure to optimize performance. In some implementations, one or more of the storage appliance 110, components of the client network 104, and protocols, such as SMB, FTP, NFS, and iSCSI, are examined and tuned. Further, one or more of the host operating systems, file system versions, mount options, and network MTU are examined and, if recommended, tuned.

Figure 2:
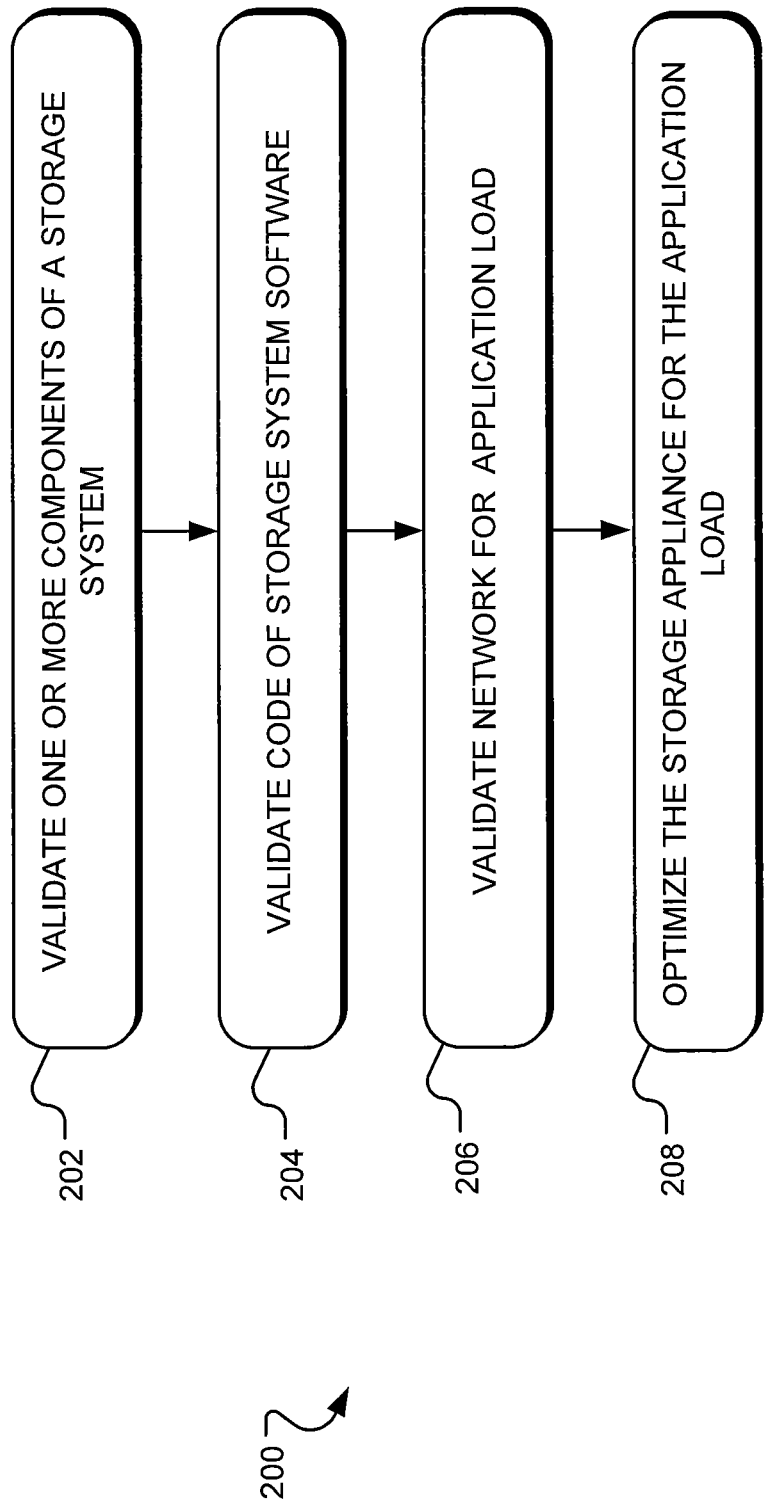
FIG. 2 illustrates example operations for tuning a storage system.

For a detailed discussion of example operations 200 for tuning the storage system 100, reference is made to FIG. 2. In performing the tuning operations 200, data is collected to characterize an applied load as related to a configuration of the storage system, a report is generated identifying one or more recommendations for optimizing the storage system based on the characterized load, and the storage system is tuned by deploying the recommendations.

In one implementation, a component validating operation 202 validates one or more components of the storage system. For example, the component validating operation 202 examines hardware and other physical components of the storage system to identify any faults and/or to confirm the components are configured to operate according to their intended use in the storage system. If any issues are identified, the component validating operation 202 resolves the issues.

A code validating operation 204 determines whether software in the storage system is utilizing current code. Further, the code validating operation 204 compares the code utilized by one or more components of the storage system to determine whether the code of each component matches the other components of the storage system. Various problems may be experienced and even appear as hardware related faults where code between components of the storage system is not current or matched. For example, where one or more of appliance kit (AK) code on the storage appliance controller, ILOM code, service processor (SP) code, and basic input/output system (BIOS) code is mismatched, components of the storage system may not be able to interact or otherwise communicate. The code validating operation 204 matches and updates the code utilized by one or more components of the storage system where necessary.

It is often the case that problems experienced by a client that appear to be faults or storage appliance related performance issues are caused by the configuration of the host or client network. Stated differently, the client network may not be configured to handle the applied load. Accordingly, a network validating operation 206 analyzes the applied load and optimizes the client network based on the applied load. For example, the network validating operation 206 may examine how the configuration of the client network affects rebooting and failback/takeover operations and determine how to optimize the performance of these operations by modifying the configuration of the client network. The network validating operation 206 remedies any network issues caused by the configuration of the client network and/or the supporting network infrastructure.

In one implementation, after collecting data relating to the application load and to the configuration of the client network and the supporting network infrastructure, an optimizing operation 208 characterizes the application load and tunes the storage appliance with respect to the characterized load. It will be appreciated that other components of the storage system may also be tuned based on the characterized load to optimize performance of the storage system. In some cases, when the optimizing operation 208 characterizes the application load, the optimizing operation 208 identifies a feature or function of the storage appliance causing a performance issue to be resolved by the client determining the importance of using those features. For example, deduplication and replication functions may cause performance issues if not properly managed relative to available resources. Deduplication tables may grow unbounded and are often stored in cache memory (e.g., the level 1 or level 2 cache). However, the capacity of cache memory is often limited because of the expense of cache memory. As such, when maximum capacity of the cache memory is reached, the deduplication table may be evicted to slower storage media, which increases the length of time it takes to perform deduplication operations and may cause performance issues. Accordingly, the performance issue may be resolved by limiting or eliminating deduplication or refining the configuration of the storage system (e.g., by adding more cache memory) based on the applied load.

All or a portion of the tuning operations 200 may be performed automatically or manually. In one implementation, the tuning operations 200 utilize a script such as DTrace to characterize the applied load and in some instances optimize the storage system based on the characterized load. The tuning operations 200 may be performed to: diagnose any reported or otherwise identified problem; proactively examine the storage system to optimize performance; initially configure the storage system to meet demands of the client; and/or otherwise tune or update the storage system.

Figure 3:
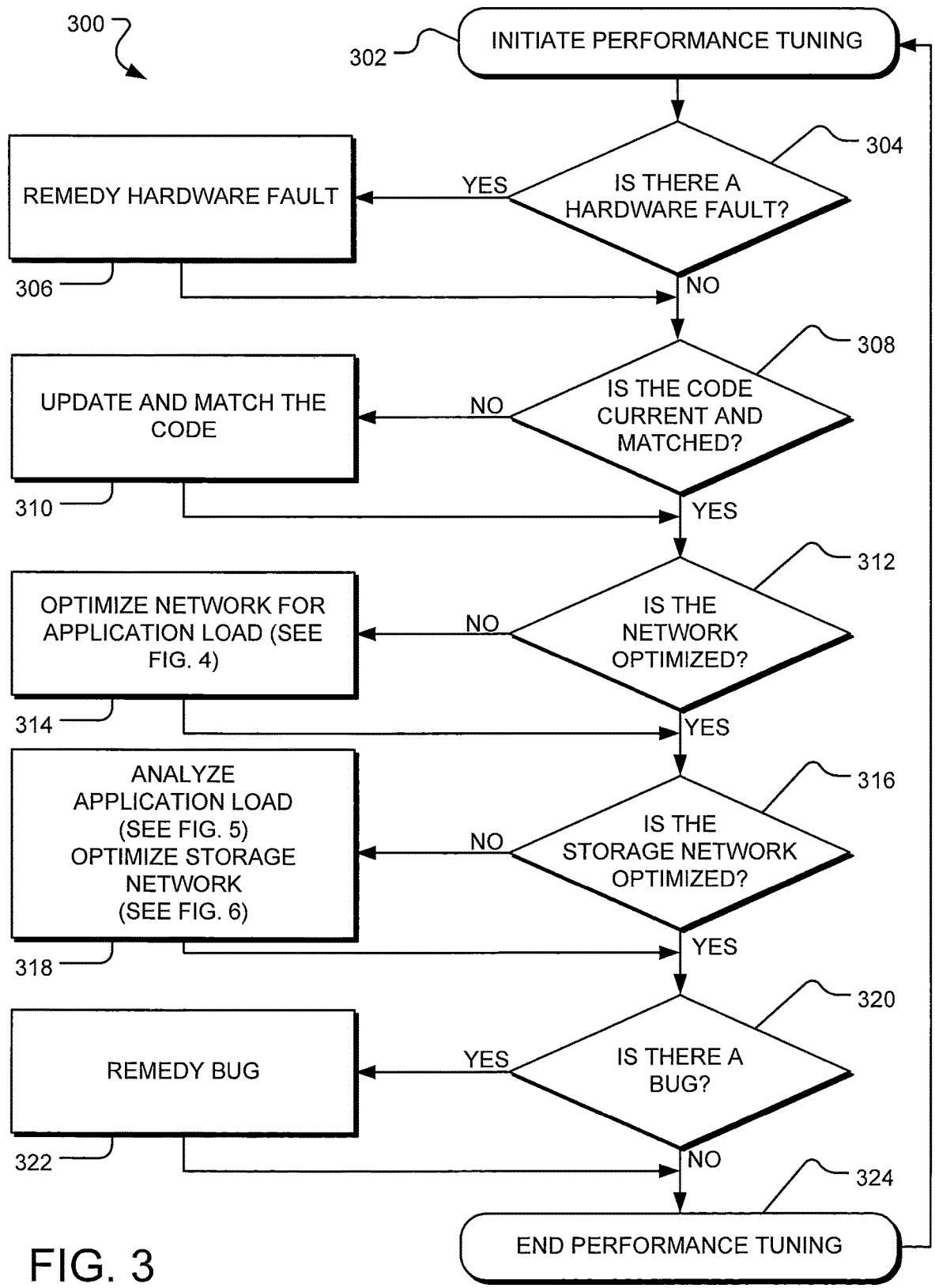
FIG. 3 shows example operations for diagnosing and remedying a reported problem in a storage system.

Turning to FIG. 3, example operations 300 for diagnosing and remedying a problem in a storage system are shown. The problem may be: reported by the client after experiencing the issue; identified during a health or status check routinely performed by the client, the administrator, and/or the storage network provider; identified during an initial configuration of the storage system; or otherwise identified.

In one implementation, an initiating operation 302 initiates performance tuning of the storage system to address the problem. In some implementations, for example, during an initial configuration of the storage system or a proactive health or status check, the operations 300 are performed in the order depicted in FIG. 3. In other implementations, the operations 300 are performed in any order or prioritized depending on the nature of observations that prompted the commencement of the initiating operation 302. In some implementations, after performing one or more of the operations 300, if the identified problem is resolved and no other problems or tuning opportunities exist, the operations 300 are complete. Accordingly, some or all of the operations 300 may be performed to diagnose and remedy a problem in the storage system.

In any event, the operations 300 provide a baseline approach for diagnosing and remedying a problem. In one implementation, the operations 300 are performed manually. In another implementation, all or a portion of the operations 300 are performed using a script, such as a DTrace script, for identifying and/or deploying corrective action.

An operation 304 determines whether a hardware related fault exists. In one implementation, the operation 304 examines the ILOM and/or the service processor (SP) to determine whether the hardware managed by the ILOM or the SP are experiencing hardware related faults. The operation 304 may utilize or examine light emitting diode (LED) indicators and/or cables to obtain information about one or more components of the storage system and determine if any experienced fault relates to connections in the storage system. If the operation 304 determines there is a hardware fault, a remedying operation 306 remedies the hardware related fault. Once the remedying operation 306 resolves hardware related fault or if the operation 304 determines a hardware related fault does not exist and rather, a problem is masquerading as a hardware fault or other performance degradation, an operation 308 is commenced. In some implementations, the operations 304 and/or 308 may utilize a support bundle for extracting information for diagnostics or may utilize BUI indicators for determining whether a problem may exist.

The operation 308 determines whether a code related fault or problem exists. Generally, code does not report when it is out of date or mismatched, and old or mismatched code may appear as a performance degradation or hardware related fault. In one implementation, the operation 308 compares code in one or more of appliance kit (AK) code on a storage appliance, ILOM code, service processor (SP) code, BIOS code, and code of other software in the storage system to determine if any code is mismatched. Further, the operation 308 examines code in the storage system to confirm whether the code is current. If the operation 308 identifies any mismatched or old code, an updating operation 310 matches and updates the code. Once the updating operation 310 resolves code related issues or if the operation 308 determines a code related issue does not exist, an operation 312 is commenced.

The operation 312 determines whether the client network is optimized or whether a problem may be caused by the client network. Stated differently, the operation 312 may analyze the client network to rule it out as a cause of any identified problems. For example, the operation 310 may identify a problem with the client network where timeouts are occurring or switch data or other platforms indicate a network issue. For example, a network name service, such as a DNS service, may not be available, thus delaying or otherwise hindering boot times and failover/takeover operations. During booting or failover/takeover operations, the client network is exposed to the network name service to start. If the network name service is not visible or available for any reason, the client network may timeout waiting for the network name service to respond.

In some implementations, the operation 312 further examines the configuration of the client network in relation to the storage network and the supporting network infrastructure to determine whether any network related issues are causing problems or can be otherwise optimized. If the operation 312 identifies any network related issues, an optimizing operation 314 optimizes the client network and supporting network infrastructure. For example, the optimizing operation 314 may perform operations like those illustrated and described with respect to FIG. 4. Once the optimizing operation 314 resolves network related issues or if the operation 312 determines a network related issue does not exist, an operation 316 is commenced.

The operation 316 determines whether the storage network is optimized for the application load. In one implementation, the operation 316 examines analytics, file system mount options, block or volume recording size, log bias, and/or other aspects of the storage network to determine whether the storage network is optimized for the application load. Each of these features may be configured or tuned to optimize performance of the client network in relation to the storage system. If the operation 316 identifies a visible storage network related performance issue, the storage network may be tuned to remedy the issue. Likewise, if the operation 316 identifies an issue that is not preventing operations of the storage system but is impacting performance (e.g., deduplication or replication features), the client may remedy the issue by determining whether to limit those functions. In some cases, the client may be utilizing features impacting performance that the client does not need.

If the problem has not been resolved and/or the operation 316 resolves to optimize the storage network, an optimizing operation 318 analyzes data to characterize the application load and identifies opportunities for tuning the storage network based on the characterized application load. For example, the optimizing operation 318 may characterize the application load by performing operations like those illustrated and described with respect to FIG. 5 and may optimize the storage network based on the characterized application load by performing operations like those illustrated and described with respect to FIG. 6. Once the optimizing operation 318 optimizes the storage network in relation to the characterized application load or if the operation 316 determines the storage network is optimized, an operation 320 is commenced.

The operation 320 determines whether a bug exists. A bug may be any problem caused by hardware or software in the storage system. Bugs may occur in any system, particularly a sophisticated system or network environment. In one implementation, if the operations 304-316 do not resolve the problem and the problem experienced by the client cannot be replicated in a lab simulation, the operation 320 may determine a bug caused the problem. If the operation 320 identifies a bug, a remedying operation 322 remedies the bug. Once the remedying operation 320 fixes the bug or if the operation 320 determines a bug does not exist, an ending operation 324 concludes the operations 300. The operations 300 may be repeated to: diagnose any subsequently identified problems; proactively examine the storage system to optimize performance; and/or otherwise tune or update the storage system.

Figure 4:
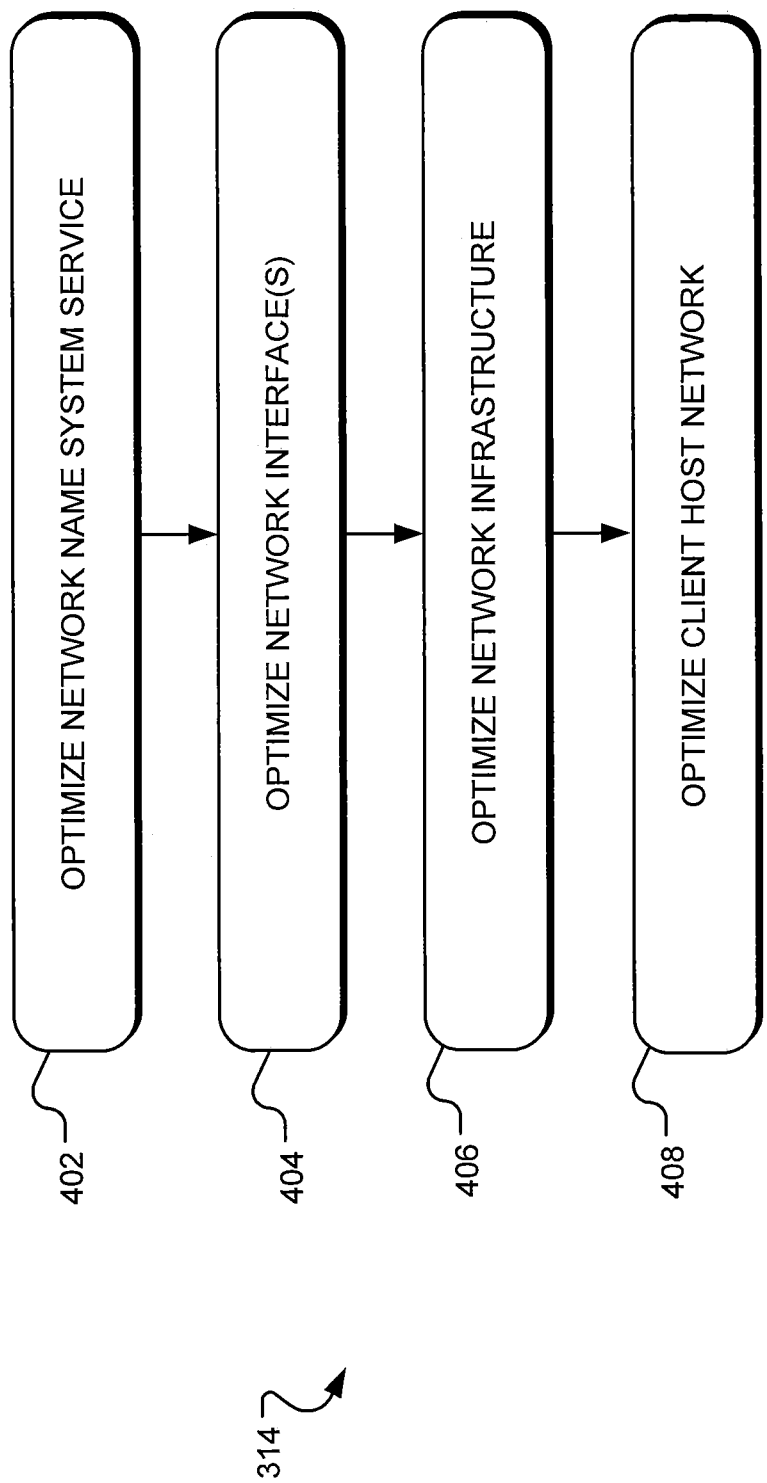
FIG. 4 illustrates example operations for optimizing the network infrastructure.
Figure 5:
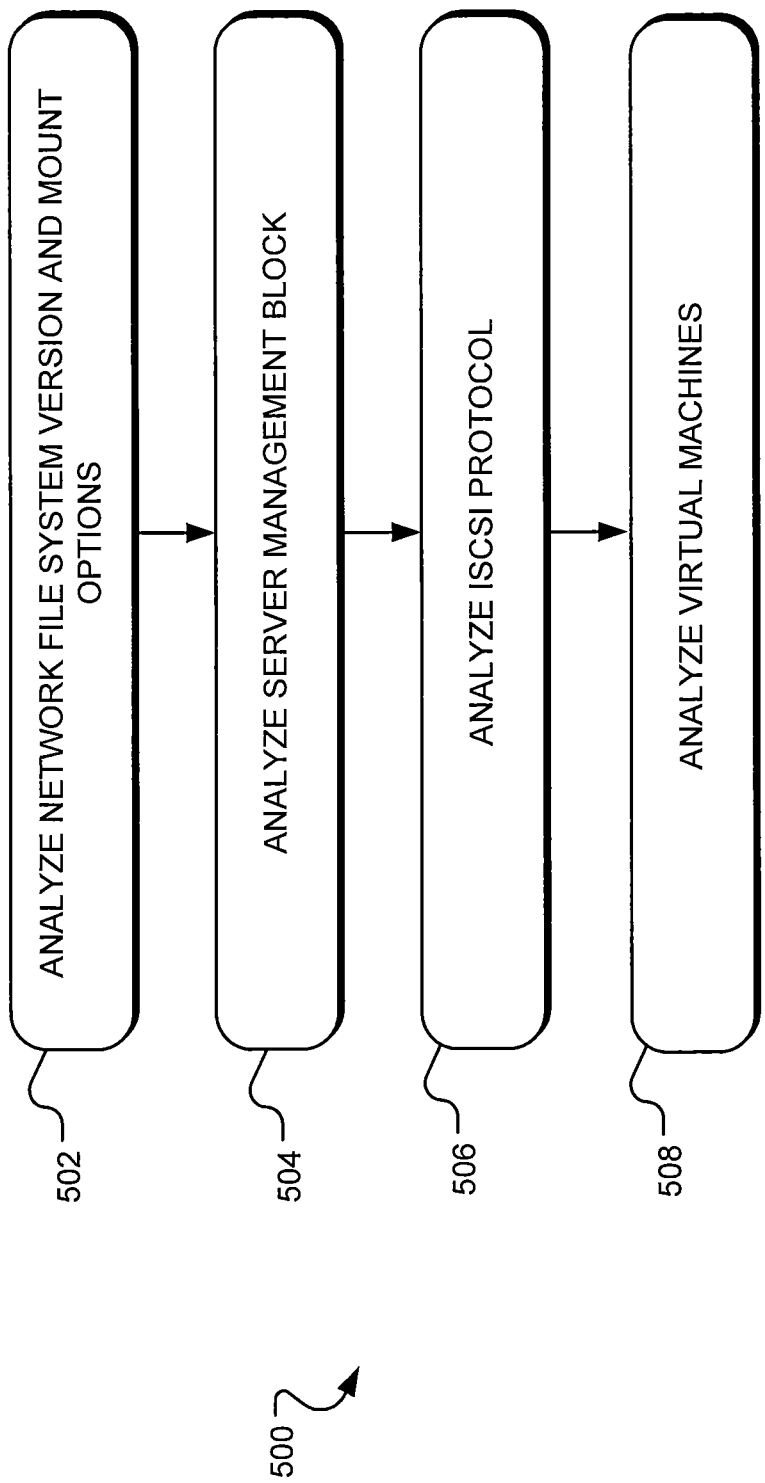
FIG. 5 show example operations for analyzing an application load.
Figure 6:
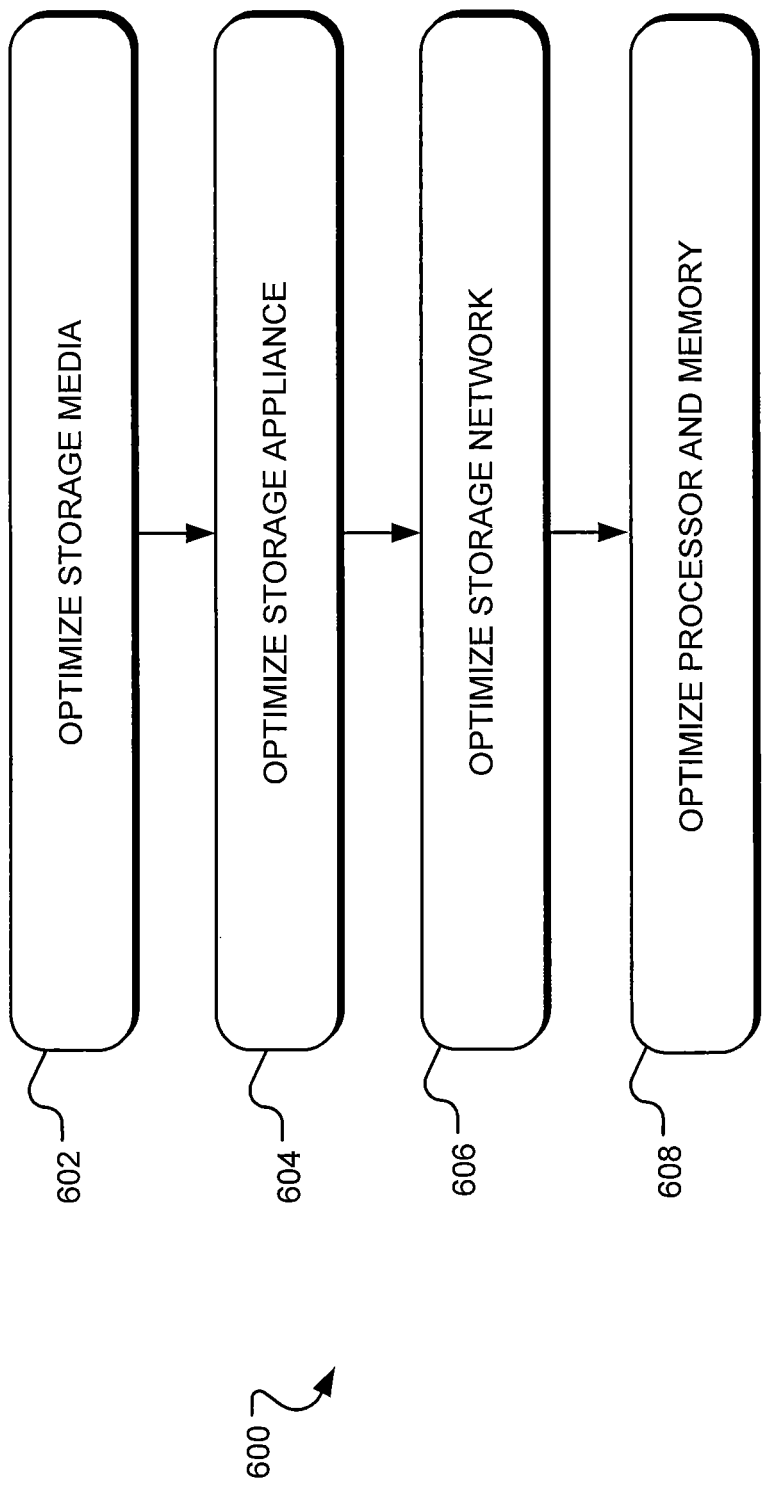
FIG. 6 illustrates example operations for optimizing a storage network in a storage system.

The operations illustrated in FIGS. 4-6 may be performed to diagnose and remedy problems in the storage system or to otherwise routinely optimize the performance of the storage system based on the application load as it relates to the configuration of the client network, the storage network, and the supporting network infrastructure. It will be appreciated that all or some of the operations illustrated in FIGS. 4-6 may be performed manually or automatically or may utilize a script, such as a DTrace script.

As can be understood from FIG. 4, which illustrates example operations 400 for optimizing the network, a baseline approach for testing and optimizing the supporting network infrastructure for the application load is provided.

In one implementation, an operation 402 optimizes a network name system service, such as a DNS service. The operation 402 determines whether previously available resources, such as the network name service, are now missing or if boot time or failback/takeover is otherwise delayed or hindered. The operation 402 provides recommendations for tuning the network name system service or for addressing any problems with the network name system service and deploys the recommendations.

An operation 404 optimizes one or more interfaces in the storage system. In one implementation, the operation 404 analyzes the type and usage of interfaces to network resources or services. For example, the operation 404 may determine whether the interfaces are sized in accordance with the data being communicated over the interfaces and whether jumbo frames are being used to take advantage of available technology. Further, the operation 404 may analyze the MTU size and the use or lack thereof of any IPMP or LACP interfaces in the storage system. Based on data corresponding to the type and usage of interfaces, the operation 404 provides recommendations for optimizing traffic through the interfaces and deploys the recommendations.

An operation 406 optimizes components of the network infrastructure, including, without limitation, switches. The operation 406 may determine whether there is a high volume of traffic on a single port or whether the switches are capable of sustaining the level of traffic experienced. In some instances, soft or hard network errors indicate a problem with a switch. In one implementation, the operation 406 examines ASIC limitations and other opportunities available for review of the switched layer or infrastructure. Based on data corresponding to the network infrastructure components, the operation 404 provides recommendations for optimizing traffic through the interfaces and deploys the recommendations.

An operation 408 optimizes the client network based on the application load. In one implementation, the operation 408 examines operating systems executed on the client network, client diagnostics (e.g., how the client network communicates or any issues created or identified by the client network), client baselines, and other aspects of the application load. In some cases, operating system settings appear as performance issues. The operation 408 examines the configuration of the client network as it relates to the storage network in the storage system. In examining client baselines, the operation 408 determines the capabilities of the storage appliance in the storage network as it relates to the client network when it is unencumbered by the application load. Based on this determination and the applied load, the operation 408 optimizes the client network based on the application load. Further, the operation 408 may identify any unintended loads included in the application load and optimize the client network to reduce or eliminate those loads.

Turning to FIG. 5, example operations 500 for analyzing an application load are shown. As can be understood from FIG. 5, data collected relating to the application load may be used to characterize the application load as it relates to the client network, the storage network, and the supporting network infrastructure.

In one implementation, an operation 502 analyzes the protocols and mount options utilized for transferring traffic among the various components of the storage system. For example, the operation 502 may determine the version of NFS used or if a client such as a direct NFS is utilized. The NFS version used impacts how data is transferred and whether the client network can communicate with the storage network. Further, some mount options, which are characterized based on the size of data blocks, may force a smaller volume recording size to match traffic coming through NFS. Based on gathered data pertaining to this analysis, the operation 502 characterizes the protocols and mount options utilized with respect to the application load. The operation 502 may further tune the application load to optimize performance of the storage system based on the characterization.

An operation 504 confirms the application load based on analytics involving the operating system(s) of the client and any programs running on the operating system. In one implementation, the operation 504 examines the server message block (SMB) in performing this analysis. For example, the operation 504 may determine which version of an operating system is used. Different versions of operating systems may produce different sizes of data blocks. Further, the operation 504 analyzes programs running on the operating system that may produce different sizes of data blocks or inflate the application load. For example, antivirus software often at least double the application load applied by the operating system. Based on gathered data pertaining to this analysis, the operation 504 characterizes the contribution of the operating system(s) of the client and any programs running on the operating system to the application load. The operation 504 may further tune the application load to optimize performance of the storage system based on the characterization.

An operation 506 analyzes the iSCSI protocol as it relates to the application load. Often, the client sets the block size for communicating with the storage network using iSCSI protocol. In some instances, the client may configure iSCSI to utilize small block sizes and subsequently attempt to delete a large file, resulting in a performance issue where the storage appliance appears unavailable. As such, the operation 506 analyzes block size and deletions in the context of iSCSI and determines whether iSCSI protocol is actually necessary in the context of the configuration of the client network as it relates to the storage system. Based on gathered data pertaining to this analysis, the operation 506 characterizes the contribution of iSCSI protocol to the application load. The operation 506 may further tune the application load to optimize performance of the storage system based on the characterization.

An operation 508 analyzes virtual machines in the context of the application load. In one implementation, the operation 506 examines analytics, mount options, block or volume recording size, log bias, and/or the like. For example, the operation 508 may determine if the block or volume recording size is optimized for use with the data sizes often utilized by virtual machines. The operation 508 may further analyze the log bias to determine whether any tunable options are selected or deselected forcing the virtual machine to behave in a particular manner. Based on gathered data pertaining to this analysis, the operation 508 characterizes the contribution of virtual machines to the application load. The operation 508 may further tune the application load to optimize performance of the storage system based on the characterization.

Referring to FIG. 6, which illustrates example operations 600 for optimizing a storage network in a storage system, the storage system may be tuned based on the characterized application load.

An operation 602 optimizes the storage media in the context of the characterized application load. In one implementation, the operation 602 examines the storage media, particularly slower storage media, such as disks, to identify high utilization of the storage media over extended periods of time. High utilization of the storage media over extended periods of time may indicate that the storage network does not have enough available storage media to support the application load. Based on the utilization of the storage media in the context of the characterized application load, the operation 602 optimizes the storage media, for example, by adding additional storage media and/or reducing the application load.

An operation 604 optimizes the storage appliance in the context of the characterized application load. In one implementation, the operation 604 examines: the features utilized by the storage appliance in the context of the application load; the size of the storage pool layer; the utilization of the storage pool layer; resilver progress; and/or other storage appliance features or components in the context of the application load.

Some features utilized by the storage appliance (e.g., deduplication, replication, etc.) may consume significant resources available to the storage application. For example, as described herein, deduplication operations have a high processor utilization and a deduplication table may consume large amounts of cached memory. Utilizing deduplication operations in such cases may significantly impact performance. Likewise large snapshot deletes may impact performance. Accordingly, the operation 604 may reduce the resources consumed by such features or provide recommendations to the client to make this determination in accordance with the characterized application load and client needs. The operation 604 analyzes the size of the storage pool layer in the context of the characterized application load to determine whether the storage system may be optimized by increasing the amount of storage media in the storage pool. Similarly, the operation 604 analyzes the level of utilization of the storage pool in the context of the characterized application load. For example, high utilization of the storage media in the storage pool or consistently writing small blocks or volumes of data to the storage pool may impact performance. As such, the operation 604 may address this issue by restructuring the layout of the storage pool. Based on the utilization of the storage appliance in the context of the characterized application load, the operation 604 optimizes the storage appliance.

An operation 606 optimizes the storage network in the context of the characterized application load. In one implementation, the operation 606 examines block sizes, heat maps, type of network activity, mount options, the type and usage of interfaces to network resources or services, utilization of replication operations; and/or other aspects of the storage network as it relates to the characterized application load. Based on the configuration of the storage network in the context of the characterized application load, the operation 606 optimizes the storage network.

An operation 608 optimizes processing and memory resources in the storage network in the context of the characterized application load. In one implementation, the operation 608 identifies any features and storage pool activities that may be limiting the availability of processing and memory resources. The operation 608 determines whether to tune the application load or other aspects of the storage system or to add additional processing and memory resources. As such, based on the utilization of the processing and memory resources in the context of the characterized application load, the operation 608 optimizes the processing and memory resources.

Figure 7:
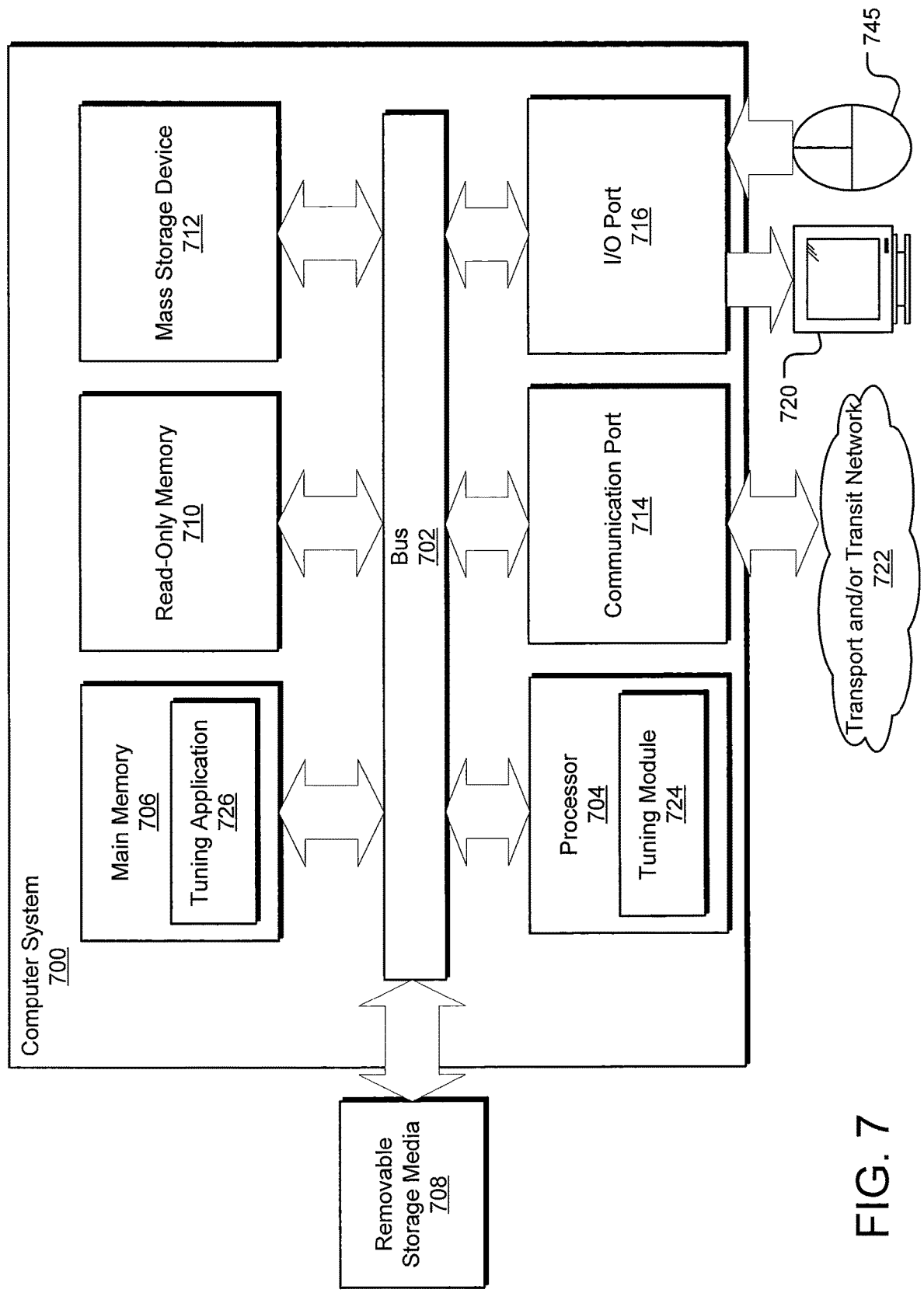
FIG. 7 is an example computing system that may implement various systems and methods discussed herein.

FIG. 7 is an example computing system that may implement various systems and methods discussed herein. The computer system 700 includes one or more processors 704. The processor 704 may include one or more internal levels of cache (not shown) and a bus controller or bus interface unit 702 to direct interaction with the processor 704. The processor 704 may include a tuning module 724 that specifically implements the various methods discussed herein. The main memory 706 may include one or more memory cards and a control circuit (not shown), or other forms of removable memory, and may store a tuning application 726 including computer executable instructions, that when run on the processor 704, implement the methods and system set out herein. Other forms of memory, such as a mass storage device 712, a read only memory 710, and a removable storage memory 708, may also be included and accessible, by the processor (or processors) 704 via the bus 702.

The computer system 700 may further include a communication port 714 connected to a transport and/or transit network 722 by way of which the computer system 700 may receive network data useful in executing the methods and system set out herein as well as transmitting information and network configuration changes determined thereby. The computer system 700 may include an I/O device 716, or other device, by which information is displayed, such as at display screen 720, or information is input, such as input device 745. The input device 745 may be alphanumeric input device, including alphanumeric and other keys for communicating information and/or command selections to the processor. The input device 745 may be another type of user input device including cursor control, such as a mouse, a trackball, or cursor direction keys for communicating direction information and command selections to the processors 704 and for controlling cursor movement on the display device 720. In the case of a tablet device, the input may be through a touch screen, voice commands, and/or Bluetooth connected keyboard, among other input mechanisms. The system set forth in FIG. 7 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:
1. A computer-implemented method comprising:
accessing a storage network configured to interact with a client device, the storage network including a storage appliance that stores a load;
collecting storage configuration data associated with the storage appliance, the storage configuration data representing one or more first configurations associated with a performance of the storage network, the one or more first configurations causing (i) one or more faults of hardware components of the storage appliance or (ii) one or more faults of software of the storage appliance;
accessing a client network including a client device, the client device being configured to execute an application, and the application being configured to perform a function that causes the client device to interact with the storage appliance of the storage network;
collecting client configuration data associated with the client network, the client configuration data representing one or more second configurations associated with at least one interaction between the client device and the storage appliance;
detecting an interaction between the client device and the storage appliance, the interaction enabling the client device to access the load stored at the storage appliance, and the interaction being associated with a performance of the storage appliance;
generating, in response to detecting the interaction, a load characteristic associated with the detected interaction, the load characteristic characterizing the load stored at the storage appliance, and the load characteristic being generated based on (i) the client device accessing the load via the application, (ii) collected client configuration data, and (iii) the storage configuration data; and
tuning, based at least in part on the load characteristic, the storage network to modify a performance of the storage appliance, the performance associated with the interaction.

2. The computer-implemented method of claim 1, wherein tuning the storage network includes automatically determining one or more workflows for modifying the performance of the storage appliance.

3. The computer-implemented method of claim 2, wherein each workflow of the one or more workflows enhances a performance metric of the application.

4. The computer-implemented method of claim 1, further comprising:
   determining that the one or more first configurations causes the one or more faults of the hardware components of the storage appliance; and
   resolving the one or more faults of the hardware components of the storage appliance.

5. The computer-implemented method of claim 1, further comprising:
   determining that the one or more first configurations causes the one or more faults of the software of the storage appliance; and
   resolving the one or more faults of the software by matching software used by different components of the storage appliance.

6. The computer-implemented method of claim 1, further comprising:
   determining that the one or more first configurations causes the one or more faults of the hardware components of the storage appliance and the one or more faults of the software of the storage appliance;
   resolving the one or more faults of the hardware components of the storage appliance; and
   resolving the one or more faults of the software by matching software used by different components of the storage appliance.

7. The computer-implemented method of claim 1, wherein tuning the storage network improves the performance metric associated with the application.

8. The computer-implemented method of claim 1, further comprising:
   comparing the load characteristic with a client baseline associated with the client network, the client baseline indicating an attribute of the client network prior to the load being accessed by the client device; and
   determining whether to tune the storage network based on the comparison.

9. A system, comprising:
   one or more data processors; and
   a non-transitory computer-readable storage medium containing instructions which, when executed on the one or more data processors, cause the one or more data processors to perform operations including:
      accessing a storage network configured to interact with a client device, the storage network including a storage appliance that stores a load;
      collecting storage configuration data associated with the storage appliance, the storage configuration data representing one or more first configurations associated with a performance of the storage network, the one or more first configurations causing (i) one or more faults of hardware components of the storage appliance or (ii) one or more faults of software of the storage appliance;
      accessing a client network including a client device, the client device being configured to execute an application, and the application being configured to perform a function that causes the client device to interact with the storage appliance of the storage network;
      collecting client configuration data associated with the client network, the client configuration data representing one or more second configurations associated with at least one interaction between the client device and the storage appliance;
      detecting an interaction between the client device and the storage appliance, the interaction enabling the client device to access the load stored at the storage appliance, and the interaction being associated with a performance of the storage appliance;
      generating, in response to detecting the interaction, a load characteristic associated with the detected interaction, the load characteristic characterizing the load stored at the storage appliance, and the load characteristic being generated based on (i) the client device accessing the load via the application, (ii) collected client configuration data, and (iii) the storage configuration data; and
      tuning, based at least in part on the load characteristic, the storage network to modify a performance of the storage appliance, the performance associated with the interaction.

10. The system of claim 9, wherein the operation of tuning the storage network includes automatically determining one or more workflows for modifying the performance of the storage appliance.

11. The system of claim 10, wherein each workflow of the one or more workflows enhances a performance metric of the application.

12. The system of claim 9, wherein the operations further comprise:
   determining that the one or more first configurations causes the one or more faults of the hardware components of the storage appliance; and
   resolving the one or more faults of the hardware components of the storage appliance.

13. The system of claim 12, wherein the operations further comprise:
   determining that the one or more first configurations causes the one or more faults of the software of the storage appliance; and
   resolving the one or more faults of the software by matching software used by different components of the storage appliance.

14. The system of claim 9, wherein the operation of tuning the storage network improves the performance metric associated with the application.

15. The system of claim 9, wherein the operations further comprise:
   comparing the load characteristic with a client baseline associated with the client network, the client baseline indicating an attribute of the client network prior to the load being accessed by the client device; and
   determining whether to tune the storage network based on the comparison.

16. A computer-program product tangibly embodied in a non-transitory machine-readable storage medium, including instructions configured to cause a data processing apparatus to perform operations including:

accessing a storage network configured to interact with a client device, the storage network including a storage appliance that stores a load;

collecting storage configuration data associated with the storage appliance, the storage configuration data representing one or more first configurations associated with a performance of the storage network, the one or more first configurations causing (i) one or more faults of hardware components of the storage appliance or (ii) one or more faults of software of the storage appliance;

accessing a client network including a client device, the client device being configured to execute an application, and the application being configured to perform a function that causes the client device to interact with the storage appliance of the storage network;

collecting client configuration data associated with the client network, the client configuration data representing one or more second configurations associated with at least one interaction between the client device and the storage appliance;

detecting an interaction between the client device and the storage appliance, the interaction enabling the client device to access the load stored at the storage appliance, and the interaction being associated with a performance of the storage appliance;

generating, in response to detecting the interaction, a load characteristic associated with the detected interaction, the load characteristic characterizing the load stored at the storage appliance, and the load characteristic being generated based on (i) the client device accessing the load via the application, (ii) collected client configuration data, and (iii) the storage configuration data; and tuning, based at least in part on the load characteristic, the storage network to modify a performance of the storage appliance, the performance associated with the interaction.

17. The computer-program product of claim 16, wherein the operation of tuning the storage network includes automatically determining one or more workflows for modifying the performance of the storage appliance.

18. The computer-program product of claim 17, wherein each workflow of the one or more workflows enhances a performance metric of the application.

19. The computer-program product of claim 16, wherein the operations further comprise:
   determining that the one or more first configurations causes the one or more faults of the hardware components of the storage appliance; and
   resolving the one or more faults of the hardware components of the storage appliance.

20. The computer-program product of claim 19, wherein the operations further comprise:
   determining that the one or more first configurations causes the one or more faults of the software of the storage appliance; and
   resolving the one or more faults of the software by matching software used by different components of the storage appliance.

* * * * *